United States Patent
Zeng

(10) Patent No.: US 7,319,937 B2
(45) Date of Patent: Jan. 15, 2008

(54) SYSTEM AND METHOD FOR PROGRAMMING MEASURING EQUIPMENT OFFLINE

(75) Inventor: Fan-Jian Zeng, Guangdong (CN)

(73) Assignees: Hong Fu Jin Precision Industry (Shen Zhen) Co., Ltd., Shenzhen, Guangdong Province, P.R.C.; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/307,587

(22) Filed: Feb. 14, 2006

(65) Prior Publication Data

US 2006/0206281 A1  Sep. 14, 2006

(30) Foreign Application Priority Data

Mar. 11, 2005  (CN) .................. 2005 1 0033620

(51) Int. Cl.
*G01D 1/00* (2006.01)
*G01B 5/004* (2006.01)

(52) U.S. Cl. ...................... 702/127; 33/503

(58) Field of Classification Search ............ 702/127, 702/155; 709/221, 220; 715/744, 733, 746, 715/747, 748; 703/1; 382/152; 700/112; 345/419, 653; 33/503
See application file for complete search history.

(56) References Cited

U.S. PATENT DOCUMENTS

| | | | | |
|---|---|---|---|---|
| 4,782,598 A * | 11/1988 | Guarini | .................. | 33/503 |
| 4,912,627 A * | 3/1990 | Ashkin et al. | .................. | 710/9 |
| 4,945,501 A * | 7/1990 | Bell et al. | ...................... | 702/95 |
| 5,453,933 A * | 9/1995 | Wright et al. | ................ | 700/181 |
| 5,771,044 A * | 6/1998 | Cragun et al. | ............... | 345/420 |
| 6,157,873 A * | 12/2000 | DeCamp et al. | ............ | 700/253 |
| 6,178,389 B1 * | 1/2001 | Sola et al. | ................... | 702/152 |
| 6,542,180 B1 * | 4/2003 | Wasserman et al. | ........ | 348/131 |
| 6,600,808 B2 * | 7/2003 | Takada et al. | ................ | 378/62 |
| 6,611,786 B1 * | 8/2003 | Zhang et al. | ................ | 702/156 |
| 6,708,138 B1 * | 3/2004 | Zhang et al. | ................ | 702/182 |
| 6,856,842 B2 * | 2/2005 | Rebello et al. | ............... | 700/31 |
| 6,879,933 B2 * | 4/2005 | Steffey et al. | .............. | 702/155 |
| 6,912,445 B2 * | 6/2005 | Shiroyama et al. | ......... | 700/182 |
| 6,968,080 B2 * | 11/2005 | Takada et al. | .............. | 382/152 |
| 7,003,161 B2 * | 2/2006 | Tessadro | ..................... | 382/199 |
| 2001/0040995 A1 * | 11/2001 | Takada et al. | .............. | 382/152 |
| 2001/0047251 A1 * | 11/2001 | Kemp | .......................... | 703/1 |
| 2003/0079002 A1 | 4/2003 | Fischer | ...................... | 709/221 |
| 2006/0093205 A1 * | 5/2006 | Bryll et al. | ................. | 382/152 |

OTHER PUBLICATIONS

Hermann, G., Feature-Based Off-Line Programming of Coordinate Measuring Machines, Sep. 15-17, 1997, Intelligent Engineering Systems Conference, pp. 545-548.*

* cited by examiner

*Primary Examiner*—John Barlow
*Assistant Examiner*—Toan M. Le
(74) *Attorney, Agent, or Firm*—Winston Hsu

(57) ABSTRACT

A computer-based method for programming measuring equipment offline is provided. The method includes the steps of: setting a format for all output measuring dimensions of a product; receiving nominal scales and tolerances corresponding to the measuring dimensions; importing the nominal scales and tolerances to the output measuring dimensions of the product; setting conversion relations between the output measuring dimensions of the product and codes of measurement software; converting the output measuring dimensions into codes of the measurement software in a client (50) connected to the measuring equipment; creating an element file in a computer (30); and loading codes of the output measuring dimensions into the element file. A related system is also provided.

6 Claims, 4 Drawing Sheets

SYSTEM AND METHOD FOR PROGRAMMING MEASURING EQUIPMENT OFFLINE

FIELD OF THE INVENTION

The present invention generally relates to systems and methods for programming equipment, and more particularly to a system and method for programming measuring equipment offline.

DESCRIPTION OF RELATED ART

Generally, measuring equipment, as used in development and production, is realized as independent which an enterprise needs to improve production quality. With the improvement of measuring equipment precision, measuring equipment becomes more complex in configuration and has more difficulty in using.

More recently, there is three-D measuring equipment which has a high precision and a high speed in measuring physical dimensions and geometric tolerances of a product. Normally, for the purpose of measuring physical dimensions and geometric tolerances of a product with a high precision and a high speed, three-D measuring equipment is programed for a measuring program finished in a computer. The computer is configured in the three-D measuring equipment and works with the three-D measuring equipment together.

In this way, it is time consuming for a user to program the three-D measuring equipment and amend a former program of the three-D measuring equipment in the computer. It is worse especially for programming the three-D measuring equipment, which is not working. In order to program the three-D measuring equipment, one typical case is that the user utilizes the computer as an interface to write a measuring program for a measuring platform which is configured in the three-D measuring equipment. However, the user has to stop the measuring platform when measuring a product, which is nearly impossible in the working speed.

What is needed, therefore, is a system and method which can program measuring equipment offline.

SUMMARY OF INVENTION

A system for programming measuring equipment offline is executed in a first computer which is linked with a measuring equipment. The system is also executed in a second computer which is part of the measuring equipment. The system includes: a setting module for setting a format for all output measuring dimensions of a product; an importing module for receiving nominal scales and tolerances corresponding to measuring dimensions, and importing the nominal scales and tolerances into the output measuring dimensions of the product; a conversion module for setting conversion relations between the output measuring dimensions of the product and codes of measurement software, and converting the output measuring dimensions into codes of the measurement software in the first computer; and a loading module for loading the codes of the output measuring dimensions converted by the conversion module into an element file from the second computer to form a new measuring program.

A computer-based method for programming a measuring equipment offline is provided. The method includes the steps of: setting a format for all output measuring dimensions of a product; receiving nominal scales and tolerances corresponding to the measuring dimensions; importing the nominal scales and tolerances to the output measuring dimensions of the product; setting conversion relations between the output measuring dimensions of the product and codes of measurement software; converting the output measuring dimensions into codes of the measurement software in a first computer connected to the measuring equipment; creating an element file in a second computer; and loading codes of the output measuring dimensions into the element file to form a new measuring program.

Other advantages and novel features of the present invention will become more apparent from the following detailed description of preferred embodiments when taken in conjunction with the accompanying drawings, in which:

DETAILED DESCRIPTION

The preferred embodiments take shadow measuring equipment named QV-Pro for an example to specifically describe the essence of the present invention. Generally, each QV-Pro has measuring software named QVPAK installed therein, and is typically non-contact precision measuring equipment for measuring physical dimensions and geometric tolerances of a product with a high precision and a high speed.

Figure 1:
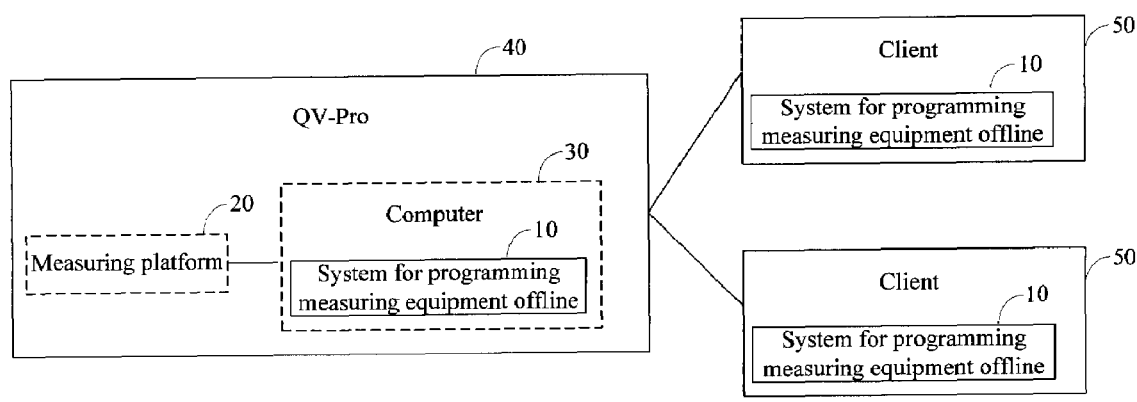
FIG. 1 is a schematic diagram of hardware configuration of a system for programming measuring equipment offline in accordance with a preferred embodiment.

FIG. 1 is a schematic diagram of hardware configuration of a system for programming measuring equipment offline in accordance with a preferred embodiment. The system for programming measuring equipment offline 10 (hereafter, "the system 10") can be executed in a computer 30, which is part of a QV-Pro 40 and is preinstalled with a QVPAK. The QV-Pro 40 further includes a measuring platform 20 linked with the computer 30 via a data cable. The system 10 can also be executed in a plurality of clients 50 (only two shown) linked with the QV-Pro 40. In an alternative embodiment, the clients 50 can work independently without any type of communications link with the QV-Pro 40.

Traditionally, a user programs the QV-Pro 40 online through the computer 30. When the user wants to measure a product, he/she may write a program for the measuring platform 20 by using the QVPAK installed in the computer 30. The computer 30 executes the program and controls the measuring platform 20 to measure the product. The computer 30 receives measuring results transmitted from the measuring platform 20 through the data cable, analyzes the measuring results, and shows the analyzed measuring results with a chart.

The user can also program the QV-Pro 40 offline in accordance with the preferred embodiment. Specifically, when the user wants to measure a product, he/she may use the system 10 installed in the clients 50 and the computer 30 to program the measuring platform 20. That is, he/she writes part of the program for the measuring platform 20 in the computer 30, and writes remaining part of the program for the measuring platform 20 in one of the clients 50. Then, the program written in the client 50 is uploaded to the computer 30. The computer 30 integrates two parts of the program to a complete measuring program, for controlling the measuring platform 20 to measure the product.

Codes of the QVPAK are constitutive of codes of many essentials. The essentials include: light source settings, measuring dimensions, dimension coordinates, dimension numbers, nominal scales, tolerances, and dimension output relations. Wherein, codes of light source settings, measuring dimensions and dimension coordinates should be encoded into an element file of measuring dimensions of a product in the computer 30. Codes of dimension numbers, nominal scales, tolerances, and dimension output relations may be encoded offline in any of the clients 50. The measuring dimensions include points, lines, surfaces and circles. The dimension output relations are output relations between nominal scales, tolerances and measuring dimensions.

Figure 2:
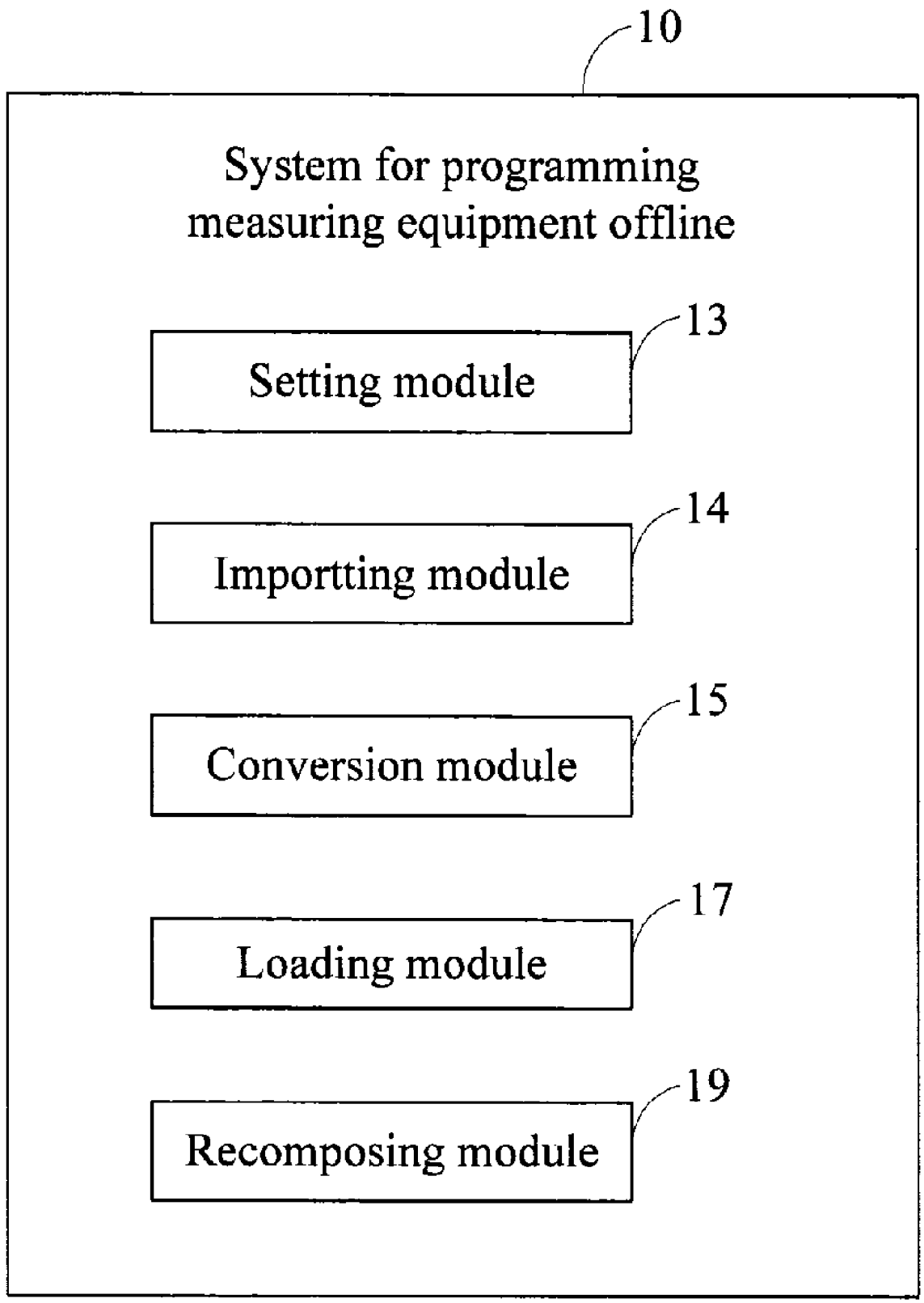
FIG. 2 is a schematic diagram of main function modules of the system of FIG. 1.

FIG. 2 is a schematic diagram of main function modules of the system 10. The system 10 typically includes a setting module 13, an importing module 14, a conversion module 15, a loading module 16, and a recomposing module 17.

The setting module 13 is used for setting a format for all output measuring dimensions of a product. For example, "1, DX, 3, 4, 2DD" means that dimension number 1 is a distance between measuring dimension 3 and measuring dimension 4 along the X-axis. In this example, "DX" denotes a dimension output relation, and specifically "DX" denotes the direction of X-axis in the output format. "2DD" denotes a relative distance from the measuring dimension 3 to the measuring dimension 4 in the present output format. In a second example, "3, DY, 45, 46, 2DD" means that dimension number 3 is a distance between measuring dimension 45 and measuring dimension 46 along the Y-axis. In a third example, "4, CA, 6, 7, 2DD" means that dimension number 4 is an angle formed by measuring dimension 6 and measuring dimension 7. In a fourth example, "5, Y, 10, LOC" means that dimension number 5 is a distance from measuring dimension 10 to the Y-axis.

The importing module 14 is used for receiving nominal scales and tolerances corresponding to various measuring dimensions, and importing the nominal scales and tolerances to output measuring dimensions. The nominal scales and tolerances can be received from an input unit or a relevant file.

The conversion module 15 is used for setting conversion relations between output measuring dimensions and codes of the QVPAK, and converting all the output measuring dimensions into codes of the QVPAK offline in a client 50.

For "1, DX, 3, 4, 2DD" as described above, the conversion relations and codes are shown as follows:
Print "#1"
Construct.Distance Tag1:="3", Tag2:="4", Label:="1DX"
ProjPlane:=NO_PLANE
Results.ReportFeature Show:=DX_, Tag:="1DX"
For "3, DY, 45, 46, 2DD" as described above, the conversion relations and codes are shown as follows:
Print "#3"
Construct.Distance Tag1:="45", Tag2:="46", Label:="3DY",
ProjPlane:=NO_PLANE
Results.ReportFeature Show:=DY_, Tag:="3DY"
For "4, CA, 6, 7, 2DD" as described above, the conversion relations and codes are shown as follows:
Print "#4"
Construct.Angle Tag1:="6", Tag2:="7", Label:="4",
ProjPlane:=XY_PLANE
Results.ReportFeature Show:=CA_, Tag:="4"
For "5, Y, 10, LOC" as described above, the conversion relations and codes are shown as follows:
Print "#5"
Results.ReportFeature Show:=Y_, Tag:="10"

The loading module 16 is used for loading codes of the output measuring dimensions converted by the conversion module 15 into an element file, which is created in the computer 30. The codes of the output measuring dimensions and codes in the element file are integrated to a new measuring program by the computer 30. The loading module 16 is also used for loading codes of the output measuring dimensions amended in the computer 30 into the element file. A continuation may also be formed in this procedure. The continuation includes variable definitions of the output measuring dimensions and subprograms to be called. For example:
'output
Dim strvalA
Private Sub QVBlock_84
Randomize
End Sub 'QVBlock_84

The recomposing module 17 is used for searching the program identification "'output" in a measuring program, separating the part containing the program identification "'output" from the measuring program without changing the element file completed by the computer 30, deleting a continuation of the measuring program, and amending all the output measuring dimensions. The program identification "'output" denotes that the part containing the program identification "'output" is completed offline in the client 50. The part containing the program identification "'output" includes: dimension numbers, nominal scales, tolerances and dimension output relations.

Figure 3:
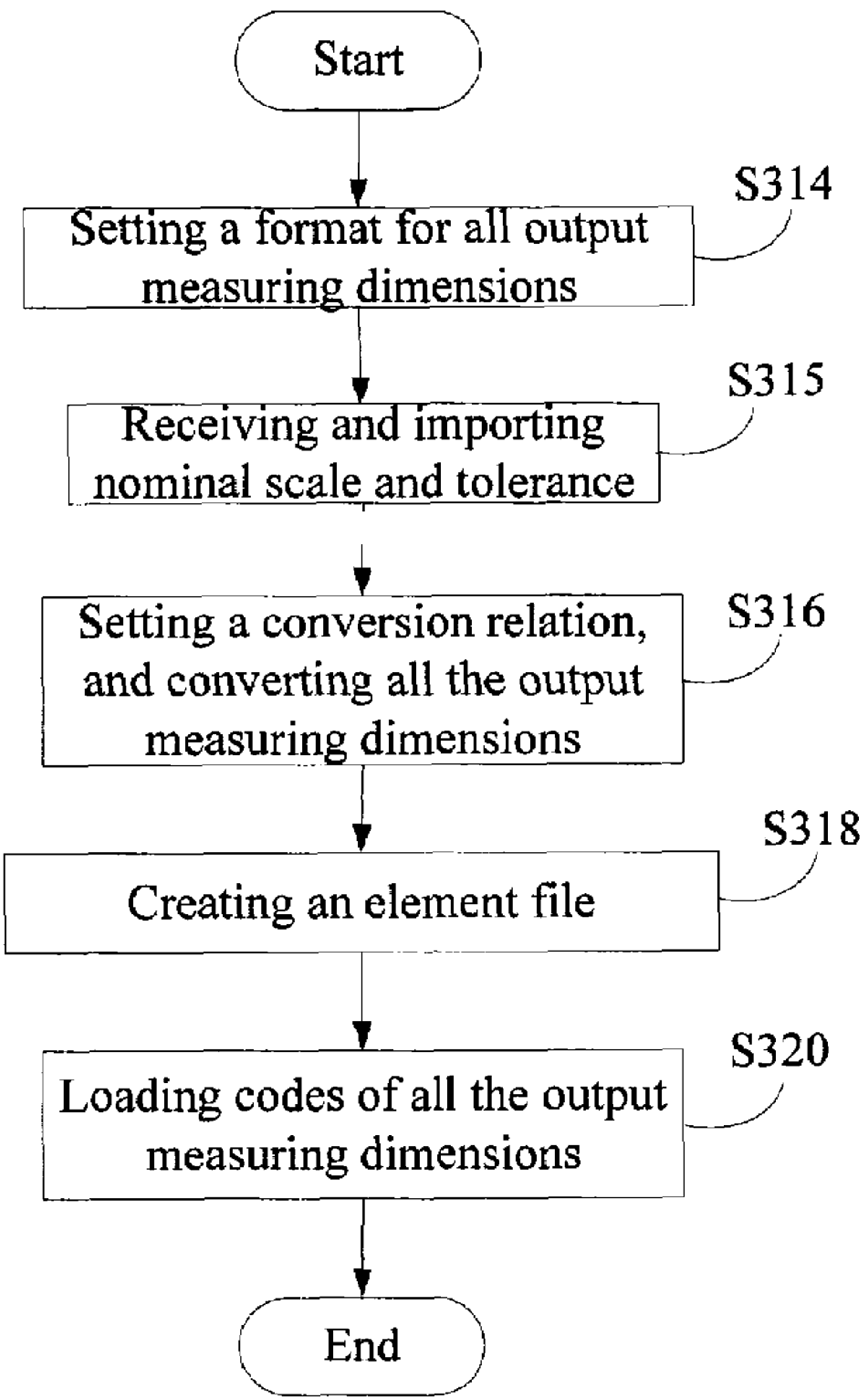
FIG. 3 is a flowchart of a method for programming measuring equipment offline in accordance with a preferred embodiment.

FIG. 3 is a flowchart of a method for programming measuring equipment offline in accordance with a preferred embodiment. When a user wants to measure dimensions of a product, he/she may use the system 10 installed in a client 50 to program the measuring platform 20. In step S314, the user activates the setting module 13 in the client 50. The setting module 13 sets a format for all output measuring dimensions of the product. In step S315, the importing module 14 receives nominal scales and tolerances corresponding to the measuring dimensions, and imports the nominal scales and tolerances to the output measuring dimensions. In step S316, the conversion module 15 sets conversion relations between the output measuring dimensions and codes of the QVPAK, and converts the output measuring dimensions into codes of the QVPAK. In step S318, the user programs the measuring platform 20 for creating an element file of measuring the dimensions of the product by using the QVPAK installed in the computer 30. In step S320, the loading module 16 loads the codes converted by the conversion module 15 into the element file to form a new measuring program.

Figure 4:
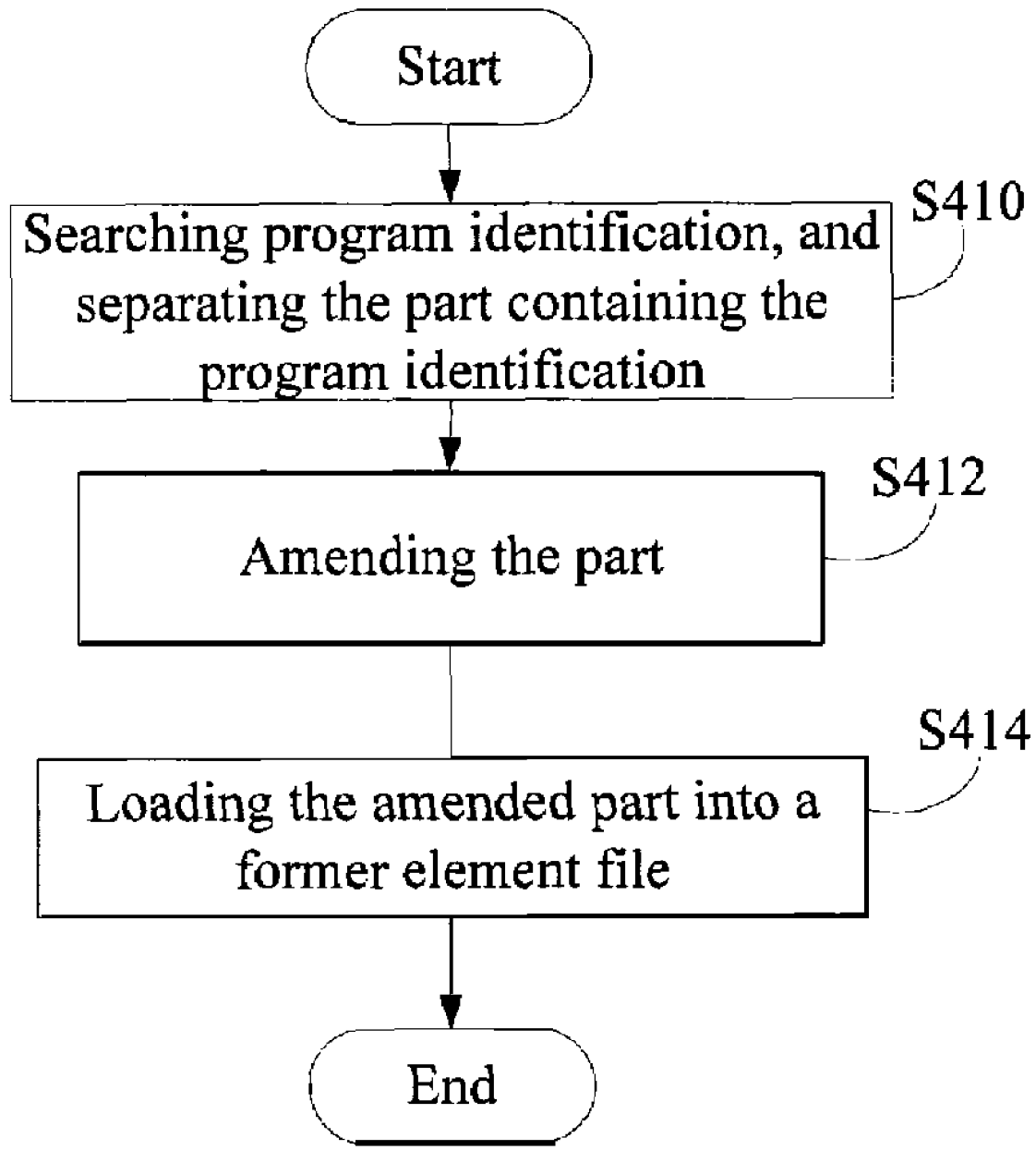
FIG. 4 is a flowchart of a method for recomposing a measuring program in accordance with a preferred embodiment.

FIG. 4 is a flowchart of a method for recomposing a measuring program in accordance with a preferred embodiment. When a user wants to measure dimensions of a product, and if the measuring program is not suitable for measuring the dimensions of the product, in step S410, the user activates the recomposing module 17 in a client 50. The recomposing module 17 searches the program identification "'output" in the measuring program, separates the part containing the program identification "'output" from the measuring program without changing the element file completed by the computer 30, and deletes the continuation of the measuring program. The program identification "'output" denotes that the corresponding part is completed previously in a client 50 offline and can be amended to measure the product. In step S412, the user amends the part containing the program identification "'output" by using the recomposing module 17 according to specific requirements of measuring the dimensions of the product. In step S414, the loading module 16 loads the part containing the program identification "'output" amended by the recomposing module 17 into the element file to form a new measuring program.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system having a computer-readable medium stored thereon computer having a program of instructions for execution by a computer for programming measuring equipment offline, the system being executed in a first computer that is linked with an item of measuring equipment, and in a second computer that is a part of the measuring equipment, the system comprising:

a setting module for setting a format for all output measuring dimensions of a product;

an importing module for receiving nominal scales and tolerances corresponding to measuring dimensions, and importing the nominal scales and the tolerances into the output measuring dimensions of the product;

a conversion module for setting conversion relations between the output measuring dimensions of the product and codes of an item of measurement software, and converting the output measuring dimensions into the codes of the measurement software in the first computer according to the conversion relations; and a loading module for loading the codes of the output measuring dimensions converted by the conversion module from the first computer into an element file in the second computer to form a new measuring program.

2. The system as claimed in claim 1, further comprising:

a recomposing module for searching a program identification in a measuring program, separating the part containing the program identification from the measuring program, and amending the part.

3. The system as claimed in claim 2, wherein the loading module is further used for loading the part amended by the recomposing module into the element file to form a new measuring program.

4. A computer-based method for programming measuring equipment offline, the method comprising the steps of:

providing a setting module for setting a format for all output measuring dimensions of a product;

providing an importing module for receiving nominal scales and tolerances corresponding to the measuring dimensions;

importing the nominal scales and the tolerances to the output measuring dimensions of the product;

providing a conversion module for setting conversion relations between the output measuring dimensions of the product and codes of an item of measurement software, wherein the conversion relations are set in a first computer connected to the measuring equipment;

converting the output measuring dimensions into the codes of the measurement software in the first computer according to the conversion relations;

providing a measuring tool for creating an element file in a second computer; and providing a loading module for loading codes of the output measuring dimensions from the first computer into the element file to form a new measuring program.

5. The method as claimed in claim 4, further comprising the step of:

recomposing a measuring program according to requirements of measuring the dimensions of the product.

6. The method as claimed in claim 5, wherein the step of recomposing a measuring program comprises the steps of:

searching a program identification in the measuring program;

separating the part containing the program identification from the measuring program;

amending the part; and loading the part into an element file in the measuring program to form a new measuring program.

* * * * *